INVENTOR.
John C. Rill, Jr.
His Attorney

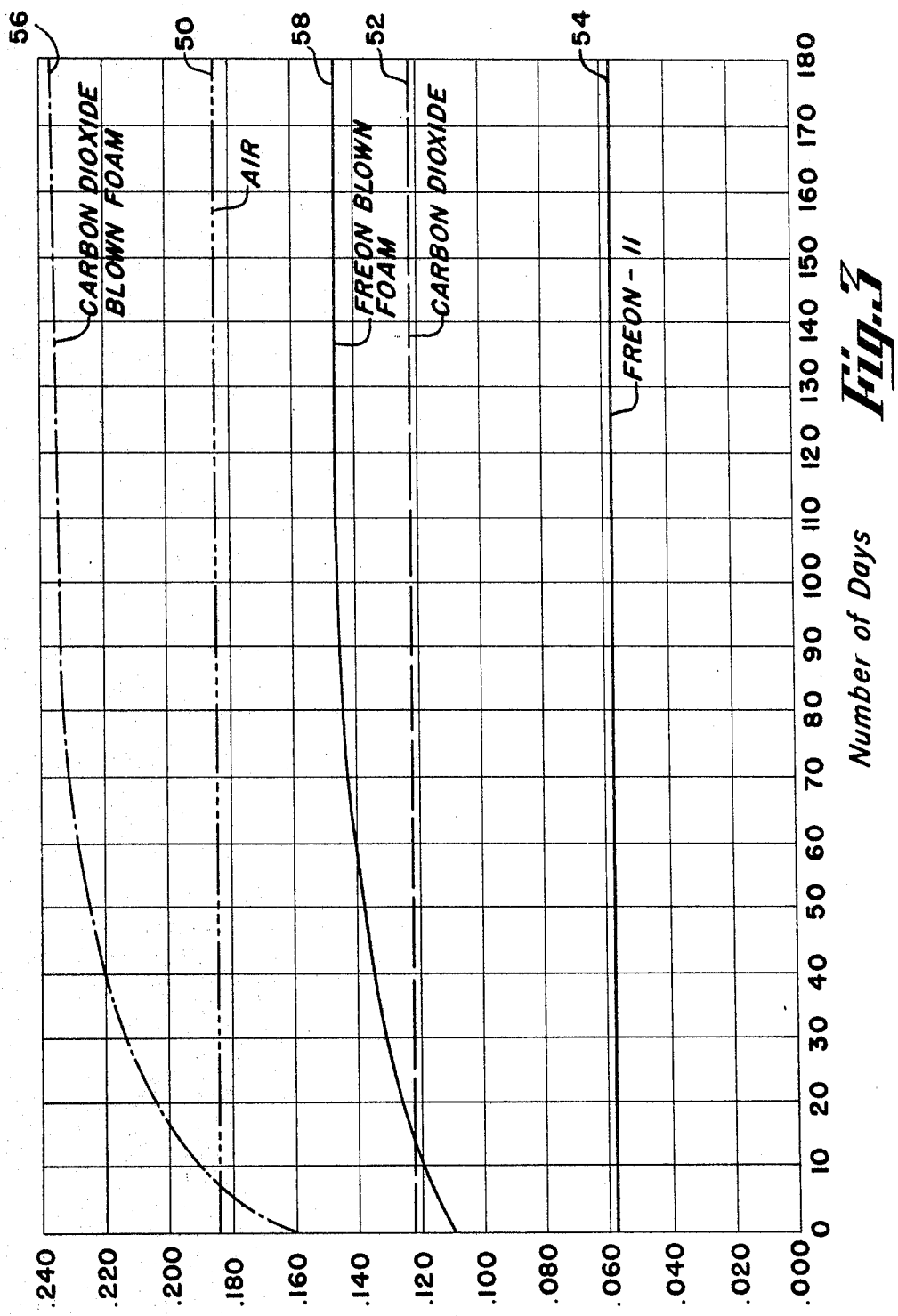

3,524,825
POLYURETHANE FOAM AND METHOD FOR MAKING SAME
John C. Rill, Jr., Dayton, Ohio, assignor to General Motors Corporation, Detroit, Mich., a corporation of Delaware
Continuation-in-part of application Ser. No. 756,880, Aug. 25, 1958. This application Apr. 29, 1959, Ser. No. 809,702
Int. Cl. C08g 22/44
U.S. Cl. 260—2.5       2 Claims This invention relates to insulating materials and method for making the same and is particularly concerned with an insulating material formed from a rigid polyurethane foam including a halogen substituted hydrocarbon substantially filling and retained within the cells thereof.

This application is a continuation-in-part of my copending application S.N. 756,880, filed Aug. 25, 1958 (now abandoned) which was a continuation-in-part of a copending application Ser. No. 692,661 filed Oct. 28, 1957, (now abandoned) which was a continuation-in-part of a copending application Ser. No. 662,411 filed May 29, 1957 (now abandoned), all of said applications being assigned to the assignee of this invention.

It is well known that a wide variety of polymeric materials such as polyesters, polyethers, polyesteramides, polyalkylene glycols, castor oil and other materials, having reactive hydrogen groups, may be reacted with the organic polyisocyanates in the presence of accelerators and water to produce foamed polyurethane plastics having varying and predetermined densities. These cellular products have a wide variety of applications and, when rigid or semirigid foams are produced, are particularly useful for structural material wherein heat insulating qualities are desired. The formation of polyurethane plastics involves a series of complex physical and chemical reactions with the evolution of heat wherein the cellular or foamed character of the plastic results generally from the formation of carbon dioxide gas which is evolved in situ during the course of the reaction.

It is apparent that the effectiveness of the material as heat insulation is inversely proportional to its thermal conductivity and this, in turn, is influenced strongly by the gas contained within the cells or voids of the material. In this respect, I have found that the carbon dioxide which initially forms, or other additional gases which may be present, and substantially fills the cells in the foam diffuses through the polyurethane cell membranes and is replaced by air. Since the coefficient of thermal conductivity of air is greater than that of carbon dioxide, it is apparent that the material, after this diffusion exchange, has lost some of its heat insulating qualities.

Various polyesters, polyethers and polyesteramides, etc., which may be used for the production of polyurethane may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or amino alcohols such as ethanolamine and aminopropanol, etc. Alkylene glycols and polyoxyalkylene glycols which may be used include ethylene glycol, propylene glycol, styrene glycol, diethylene glycol, polyethylene glycol, and polypropylene glycol and copolymers of these glycols, etc. Polyethers may be formed by reacting polypropylene oxide, or ethylene oxide, for example, with sorbitol, trimethylolpropane pentaerythritol, etc.

Examples of suitable organic polyisocyanates for use in the reaction include aromatic diisocyanates such as toluene-2,4-diisocyanate, toluene-2,6-diisocyanate and mixtures thereof, ethylene diisocyanate, propylene-1,2-diisocyanate, butylene-1,3-diisocyanate, hexylene-1,6-diisocyanate, triphenylmethane diisocyanate, 1,5-naphthalene diisocyanate, m-phenylene diisocyanate, and diphenylmethane diisocyanate, etc.

Examples of accelerator components for promoting the polyaddition reaction between the polyester, polyether and polyesteramide, etc., and the organic polyisocyanate include ethanolamine, ethylethanolamine, diethylethanolamine, pyridine, hexahydrodimethylaniline, methyl piperazine, dimethyl piperazine, tribenzylamine, morpholine and N-methyl morpholine, etc.

It is also known that, in place of reacting the polyisocyanate and the polymeric material with the evolution of substantial quantities of carbon dioxide to form the cells in the polyurethane foam, it is possible to control the cell formation by reacting specific polymeric materials with the polyisocyanates so as to reduce and control the in situ gas evolution and to add controlled quantities of a suitable material to provide additional gas by introducing the same into the reaction mixture, as a gas or liquid, prior to the complete polymerization thereof. In this manner, cells are formed in a controlled manner wherein the gas within the cells is a mixture of carbon dioxide formed in situ and any other gaseous material which was added during the reaction. Furthermore, this method aids in reducing crusty, poorly foamed surface layers where no mold surface is present and is therefore useful in connection with flexible foams for cushions and the like molded in open molds.

The added gas may be any one of a number of generally nonreactive gases which are preferably soluble in one or more of the reactants and, in this respect, carbon dioxide may be used together with methyl chloride, ethyl chloride, nitrogen monoxide ($N_2O$), etc. In general, this gas is added under high pressure to the polyester material and the mixture, under pressure, is reacted with the polyisocyanate whereupon, when cross linking or polymerization is completed, a rather uniform cell structure is obtained. As before, however, the gas used to fill the cells, whether it be all carbon dioxide or a mixture of carbon dioxide with another material, will eventually diffuse through the polyurethane membranes and be replaced by air whereby the ultimate product is a polyurethane foam having the cells thereof filled with air.

An example of a polymeric material for use with this controlled procedure is a cross linking type polyester with a molecular weight ranging from 1500 to 2500 and having an OH number of about 60. Such a polyester may be made by reacting about molar quantities of adipic acid and diethylene glycol in the presence of a small quantity of a cross linking agent such as trimethylol propane, for example, about 1/30 of a mol per mol of adipic acid used. This polyester is reacted with a polyisocyanate, for example, toluene disocyanate, etc., in the following proportions:

| | Parts by wt. of liquid |
|---|---|
| Polyester | 100 |
| Toluene diisocyanate | 25 |
| Activator | 8 |
| Methyl chloride | 5 |

The activator may comprise a mixture of 3 parts of the esterification product of 1 mol of adipic acid and 2 mols of diethyl ethanolamine; an emulsifier such as an oleic acid soap and ethyl amine 2 parts; and water 1.2 parts, all proportions being by weight.

The reaction is carried out as follows. The methyl chloride is dispersed in the polyester by admitting the liquefied gas into a pressure chamber with the polyester while agitating the mixture and maintaining it at below room temperature. This mixture is then pumped at high pressure (about 1000 p.s.i.) and at a temperature of about 70° F. to a nozzle, the toluene dissocyanate is simultaneously pumped (1000 p.s.i.) to the nozzle as is the activator and the ingredients are mixed therein and the mixture is filled into a mold where the reaction progresses together with the gasification of the methyl chloride. Of course, controlled quantities of carbon dioxide are being evolved simultaneously due to the presence of water in the activator to provide a mixture of carbon dioxide and methyl chloride as the cell forming agent which gases are subsequently lost by diffusion processes and are replaced by air as previously set forth. The foam forced in this case is flexible.

In this connection, instead of a flexible foam, a rigid foam containing carbon dioxide and a secondary blowing agent contained within the cells thereof may be made, if desired, by proper control of the cross linking reaction together with proper selection of the polyester, such deviations being well known in the art.

The processing as noted heretofore may be carried out by methods and apparatus disclosed in Pat. 2,958,516, and assigned to the assignee of the present invention or by procedures suggested in Hoppe Pat. 2,764,565, etc.

In order to obtain the improved heat insulating qualities which are obtained with cell gases having lower coefficients of thermal conductivity than air, it has been proposed, as noted in copending application Ser. No. 574,302 to Gaugler and assigned to the assignee of this invention, to encase the foam, immediately after its formation, in a sheath of gas impervious material which prevents the diffusion of gases either into or out of the cells. This sheath material, while highly effective to achieve improved insulating qualities, is expensive and, therefore, it is useful only in specific applications such as where cost is not a controlling factor in the use of the product.

The foregoing discourses have been offered to show the state of the art with respect to the production of foamed polyurethane either rigid or flexible; the methods used for accomplishing the foaming step and the problems and drawbacks that have been apparent when any of these materials are used for heat insulating purposes. The present invention is directed to novel procedures which present an entirely new and different end product that has properties heretofore desired but never attained.

It is, therefore, the basic object of this invention to provide a thermal insulation and method for making the same which has all the structural qualities of previously known rigid polyurethane foams and which has greatly improved heat insulating qualities over any polyurethane foam heretofore known. This is accomplished by selecting specific polymeric materials which may be reacted with polyisocyanates, under strictly controlled conditions for eliminating or for closely limiting the evolution of carbon dioxide, to form closely cross linked polyurethanes wherein the material is foamed, preferably at atmospheric pressure and while still in a mobile state, solely by the use of one or more selected liquefied halogenated hydrocarbon whereby a homogeneous liquid mixture is obtained. As the cross linking reaction progresses, the halogenated hydrocarbon is rendered gaseous due to the exothermic heat produced by the polymerization reaction, to cause the same to form closed cells within the material. When the cross linking reaction is completed, a rigid polyurethane foam is produced wherein each cell thereof is substanitally filled with a gaseous substantially insoluble halogenated hydrocarbon compound and, due to the specific materials selected for the reaction and the highly cross linked character of the foam together with the specific hydrocarbon chosen, this gaseous compound is indefinitely retained within the cells of the polyurethane.

It is apparent that this material will produce a greatly improved heat insulating barrier due to the fact that the halogenated hydrocarbons selected for use have very low coefficients of thermal conductivity and that these materials are held within each cell of the polyurethane foam to improve the heat insulating qualities thereof over similar foams wherein the cells are eventually filled with air.

To this end, I prefer to cause the initial contents of gas within the cells to be at least 93% by volume of a halogenated hydrocarbon such as trichloromonofluoromethane. This desideratum is accomplished by closely controlling and carefully limiting the evolution of carbon dioxide gas during the polymerization reaction through control of water and acid groups in the reactants. In this connection, a minute quantity of water is normally present as an unavoidable impurity in anhydrous reactants and is normally found in anhydrous grades of chemically pure material. This impurity will react with otherwise unreacted, or free, NCO groups which will cause a minute quantity of carbon dioxide to be formed by the reaction. I have found that, if the water impurity does not exceed .25% by weight and preferably is not over .1% by weight, the carbon dioxide evolution will not affect deleteriously the coefficient of thermal conductivity of the cell gases since the carbon dioxide will not, at any time, exceed 7% by volume of the cell gases.

The percent of water in the anhydrous materials as above-noted is as low as can be obtained commercially without excessive expense and, therefore, must be tolerated in commercial practices. However, if completely anhydrous materials could be obtained, these would be used and would improve the insulating qualities of the foam.

It is to be appreciated that the reaction here obtained is one which is substantially devoid of urea linkages heretofore present in polyurethane foams formed by conventional reactions involving the evolution of carbon dioxide which linkages are believed to be relatively weak. The presently disclosed foam, therefore, presents an entirely new material and one which will retain the halogenated hydrocarbon gas which is added to the reactants and is used to form the cells in differentiation to past formulations wherein a gas which is evolved in situ is not retained. The improved strength of the foam, due to control and reduction of the urea linkages, enhances the physical state of the cell membranes and, thus, aids in retention of specific gases.

The polyurethane foams formed by the several reactions disclosed herein have definitely lower moisture permeability rates than foams formed by conventional practices such as by in situ evolution of carbon dioxide. The control and reduction of urea linkages may explain this improved permeation rate. These foams, therefore, are more useful in all applications where excessive moisture is present than $CO_2$ blown foams which include urea linkages.

The theory explaining the retention of certain selected halogenated hydrocarbon gases within the cells of selected polyurethane materials appears to be that certain selected polyurethane materials are closely cross linked and thus present a well-knit barrier to diffusion. To improve this condition, the halogenated hydrocarbon gases selected for use are relatively heavy and present relatively large molecules. These gases do not diffuse readily through the cell membranes nor are they appreciably soluble in the polyurethane material. Actual tests have demonstrated that the system will stabilize rapidly to present a curve which becomes asymptotic to a straight line when thermal conductivity is plotted against time. This condition has been maintained under long period tests made under elevated temperature conditions. In all cases, the heat insulating qualities of the material have been tremendously improved over other polyurethane foams formed by the usual procedures as heretofore set forth.

The use of fluorohalogenated hydrocarbons as the sole means for producing cells in the polyurethane reaction also offers definite advantages in processing. For example, the exothermic heat of reaction of the polyisocyanate and the polymer, such as the polyester, is quite high and prepolymer techniques have been developed as explained herein to reduce and control this exothermic heat. However, even with these techniques, thick sections of the polyurethane are difficult to mold without fissures, burning, etc., because of overheating. By using the fluorohalogenated hydrocarbons as a liquid addition, the latent heat of vaporization thereof takes up much of this exothermic heat whereby control of the reaction is improved greatly and thick sections may be cast easily which heretofore were difficult or impossible to make without imperfections or burning.

Another object of the invention is to provide a foamed-in-place laminated structure for heat insulating purposes including one or more sheets of metal, wood or plastic material, etc., coextensively bonded at one side thereof to a rigid layer of a selected highly cross linked, closed cell polyurethane foam wherein the cells are substantially filled with a selected fluorochlorinated aliphatic hydrocarbon gas which is retained within the cell structure.

Still another object of the invention is to provide a method for forming a rigid polyurethane foam with improved heat insulating qualities containing an insoluble halogenated hydrocarbon gas wherein said gas, in the liquefied state, is added to a polyisocyanate at substantially atmospheric pressure to form a fluid mixture which is then reacted with a selected polymeric material having an acid number of below 2, said hydrocarbon being converted to a gaseous state by the heat of reaction during the controlled polymerization of the polyisocyanate and polymeric material for forming cells in the material which retain said insoluble hydrocarbon gas.

A further object is to provide a rigid, heat insulating foam and method for making the same, comprising, a foamed polyurethane having the cells thereof substantially filled with a retained gas consisting of at least one of the fluoro-halogenated saturated aliphatic hydrocarbons preferably having a boiling point of between 35° F. and 140° F.

In carrying out the above objects, it is a further object to use one or more of the fluorohalogenated aliphatic hydrocarbons taken from the class consisting of trichloromonofluoromethane (Freon 11), trichlorotrifluoroethane (Freon 113), dichlorotetrafluoroethane (Freon 114), dibromodifluoromethane (Freon 12–B2), mixtures thereof, etc.

Further objects and advantages of the present invention will be apparent from the following description, reference being had to the accompanying drawings wherein preferred embodiments of the present invention are clearly shown.

In the drawings:

FIG. 3 is a series of charts showing heat conductivity in relation to time for various materials.

Figure 1:
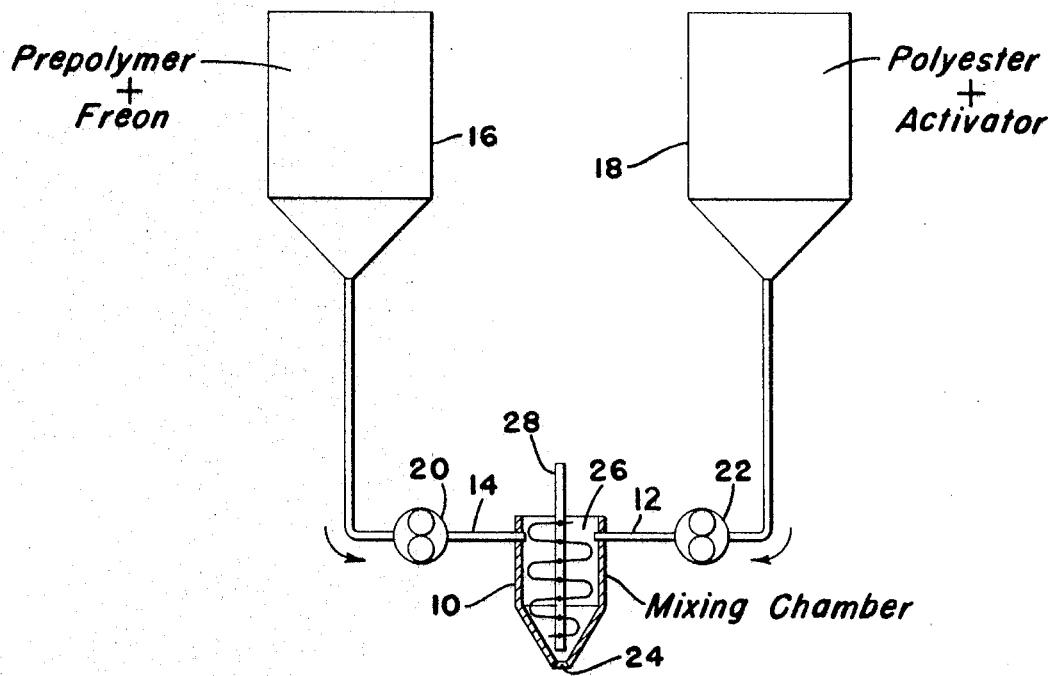
FIG. 1 is a diagrammatic view of mixing apparatus which may be used in preparation of foamed polyurethane heat insulation materials.

The preparation of foamed polyurethane insulation as described herein involves the introduction of the several components leading to the formation of the polyurethane foam into a mixing zone from several supply sources. Apparatus suitable for this purpose is shown schematically in FIG. 1 of the drawing and includes an enclosed mixing chamber 10 having conduits 12 and 14 leading thereto from storage tanks 16 and 18 respectively through positive displacement pumps 20 and 22 which are capable of accurately metering the flow of material passing therethrough. The chamber 10 includes a conical nozzle portion 24 and a mixing device such as a loop-type mixing rotor 26 therein which extends into close proximity with the walls of the chamber. This rotor is carried by a shaft 28 that is connected to a high speed motor, not shown. The rotor 26 is preferably rotated at a speed of 4000 r.p.m. but may be rotated at speeds ranging between 3000 to 6000 r.p.m. This mixing device is operative to thoroughly mix the materials being fed to the chamber by the pumps from the storage tanks. The storage tanks and mixing chamber are provided with suitable temperature control devices to maintain desired temperature conditions at all times.

Figure 2:
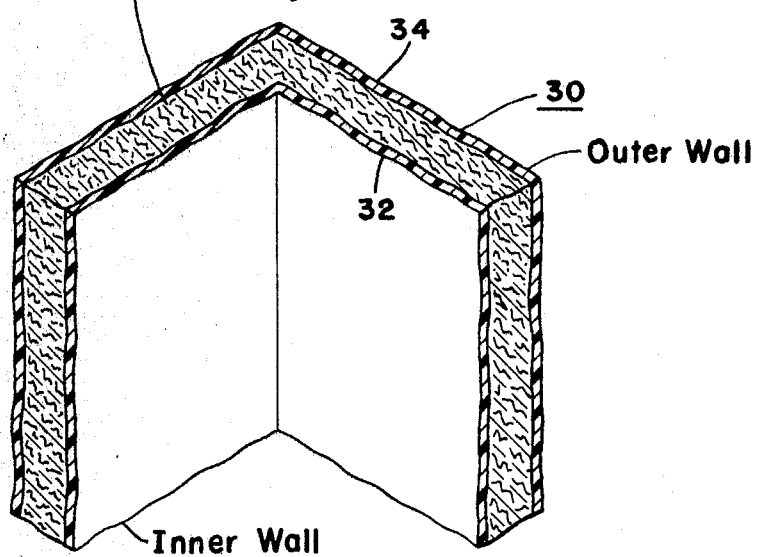
FIG. 2 is a fragmentary view in perspective of a corner portion of an insulated cabinet such as a refrigerator cabinet.

As the various materials pass into the chamber 10, they are mixed and are discharged therefrom through the nozzle 24. This nozzle may be positioned directly over a mold wherein the flowable polyurethane is formed into a rigid mass which fills the mold upon completion of the reaction. In this conection, it is understood that the mold may be of a conventional type or it may consist of a cabinet structure 30, as shown in FIG. 2, having spaced inner and outer walls 32 and 34. In this case, the flowable polyurethane material is poured in place between the walls in proper quantities so that, upon full foaming thereof, the space betwen the walls will be completely occupied. The polyurethane foam, upon completion of the reaction, not only fills the spaces between the walls but is actually bonded coextensively to the walls whereby a strong, unitary structure is obtained that is highly advantageous in the manufacture of insulated cabinets and the like.

It is manifest that other known mixing apparatus and procedures may be used, the description heretofore given being exemplary of one useful apparatus and procedure.

It is further to be understood that the walls of the cabinet, if the material is to be foamed in place, may be metal, wood, plastic, etc., which become bonded to the rigid polyurethane layer. Also, it is possible to form cabinets with one wall only such as the outer wall 34 wherein the inner form of the cabinet is produced by a removable inner mold surface which is treated with a suitable release agent so that it does not bond to the polyurethane. In this instance, the molded surface may be painted or otherwise suitably finished, if desired.

In some instances, it may be useful to utilize plastic films rather than sheets as the wall surface. These films not only become coextensively bonded to the polyurethane layer but likewise act as the release means for the molded structure so that the same can be easily removed from the mold. The plastic films provide attractive finishes which are impervious to certain materials according to the specific plastic film used. All of these modifications come within the purview of this invention which is basically directed to the formation of a rigid, heat insulating layer comprising a polyurethane foam having the cells thereof substantially filled with a low heat conductivity gas which is indefinitely retained therein.

A wide variety of materials may be used to form the rigid, heat insulating material and any of the organic diisocyanates set forth hereinbefore are generally suitable for this purpose. Toluene diisocyanates, due to their ready availability and lower cost, are preferred and the following mixtures are set forth as useful (expressed in parts by weight):

| Isocyanate ingredient A: | Parts |
|---|---|
| 2,4 toluene diisocyanate | 80 |
| 2,6 toluene diisocyanate | 20 |
| Isocyanate ingredient B: | |
| 2,4 toluene diisocyanate | 75 |
| 2,6 toluene diisocyanate | 25 |
| Isocyanate ingredient C: | |
| 2,4 toluene diisocyanate | 90 |
| 2,6 toluene diisocyanate | 10 |
| Isocyanate ingredient D: | |
| 2,4 toluene diisocyanate | 65 |
| 2,6 toluene diisocyanate | 35 |
| Isocyanate ingredient E: | |
| 2,6 toluene diisocyanate | 100 |
| Isocyanate ingredient F: | |
| 2,4 toluene diisocyanate | 100 |

The mixture of isocyanate ingredient A is a commercial yield mixture and, therefore, is the least expensive at this time.

Specific polyesters that are useful in the present invention may be made from the following recipes:

Polyester A (expressed in mols unless otherwise noted):
- Phthalic anhydride _____ 2
- Adipic acid _____ 10
- Trimethylol propane _____ 18
- Lead (as metallic lead by weight), percent___ .030
- OH No. _____ 440
- Acid No. max. _____ 1.5
- $H_2O$ max. (by weight), percent_____ .15
- Viscosity (cps.) at 165° F. _____ 2900

Polyester B (expressed in mols unless otherwise noted):
- Phthalic anhydride _____ 2
- Adipic acid _____ 10
- Trimethylol propane _____ 18
- Lead (as metallic lead by weight), percent___ .030
- OH No. _____ 445
- Acid No. max. _____ .60
- $H_2O$ max. (by weight), percent_____ .10
- Viscosity (cps.) at 165° F. _____ 4100

Polyester C (expressed in mols unless otherwise noted):
- Phthalic anhydride _____ 2
- Adipic acid _____ 10
- Trimethylol _____ 18
- Lead (as metallic lead by weight), percent ___ .026
- OH No. _____ 450
- Acid No. max. _____ 1.0
- $H_2O$ max. (by weight), percent _____ .05
- Viscosity (cps.) at 165° F. _____ 3590

Polyester D (expressed in mols unless otherwise noted):
- Phthalic anhydride _____ 2.1
- Adipic acid _____ 10
- Trimethylol propane _____ 18.8
- Lead (as metallic lead by weight) _____ 0.0
- OH No. _____ 460
- Acid No. max. _____ .80
- $H_2O$ max (by weight), percent _____ 0.14
- Viscosity (cps.) at 165° F. _____ 3870

Polyester E (expressed in mols unless otherwise noted):
- Phthalic anhydride _____ 2
- Adipic acid _____ 13
- Trimethylol propane _____ 22
- OH No. _____ 420
- Acid No. max. _____ .12
- $H_2O$ max. (by weight), percent _____ .12
- Viscosity (cps.) at 165° F. _____ 3560

Polyester F (expressed in mols unless otherwise noted):
- Adipic acid _____ 1.2
- Trimethylol propane _____ 1.86
- OH No. _____ 453
- Acid No. _____ .8
- $H_2O$ (by weight) _____ .1
- Viscosity (cps.) at 83° F. _____ 98,000

Polyester G (expressed in mols unless otherwise noted):
- Adipic acid _____ 1.2
- Trimethylol propane _____ 2.05
- OH No. _____ 499
- Acid No. _____ 1.0
- $H_2O$ (by weight) _____ .1
- Viscosity (cps.) at 83° F. _____ 66,500

Polyester H (expressed in mols unless otherwise noted):
- Adipic acid _____ 1.2
- Trimethylol propane _____ 1.6
- OH No. _____ 362
- Acid No. _____ 1.0
- $H_2O$ (by weight) _____ .12
- Viscosity (cps.) at 83° F. _____ 280,000

Polyester I (expressed in mols unless otherwise noted):
- Sebacic acid _____ 1.2
- Trimethylol propane _____ 1.86
- OH No. _____ 376.0
- Acid No. _____ 1.9
- $H_2O$ (by weight) _____ .12
- Viscosity (cps.) at 83° F. _____ 50,000

Polyester J (expressed in mols unless otherwise noted):
- Sebacic acid _____ 1.0
- Succinic acid _____ .2
- Trimethylol propane _____ 1.86
- OH No. _____ 367
- Acid No. _____ 1.9
- $H_2O$ (by weight) _____ .1
- Viscosity (cps.) at 83° F. _____ 75,000

Polyester K (expressed in mols unless otherwise noted):
- Succinic acid _____ 1.2
- Trimethylol propane _____ 1.86
- OH No. _____ 490
- Acid No. _____ .7
- $H_2O$ (by weight) _____ .11
- Viscosity (cps.) at 83° F. _____ 685,000

Polyester L (expressed in mols unless otherwise noted):
- Adipic acid _____ 1.2
- Trimethylolethane _____ 1.86
- OH No. _____ 450
- Acid No. _____ .7
- $H_2O$ (by weight) _____ .13
- Viscosity (cps.) at 83° F. _____ 205,000

Polyester M (expressed in mols unless otherwise noted):
- Adipic acid _____ 1.2
- Trimethylol propane _____ 1.39
- Glycerol _____ .47
- OH No. _____ 457
- Acid No. _____ 1.0
- $H_2O$ (by weight) _____ .1
- Viscosity (cps.) at 83° F. _____ 87,500

Trimethylol propane is specifically 2,2-dihydroxymethyl-1-butanol.

All of these polyesters are prepared by conventional processes such as by cooking the several ingredients in the reaction kettle preferably with small quantity of a lead salt sufficient to provide the percentage of metallic lead noted. The lead salt, sometimes termed a "hardener," is use to promote esterification and may be an organic lead salt, an oxide, etc., as is well known in the art of making alkyd resins.

Specific polyesteramides that are useful in the present invention may be made from the following recipes.

Polyesteramide A (expressed in mols unless otherwise noted):
- Diethylsebacate _____ 1.2
- Ethanolamine _____ .6
- Trimethylol propane _____ 1.45
- OH No. _____ 371
- Acid No. _____ 1.1
- $H_2O$ (by weight) _____ .13
- Viscosity (cps.) at 83° F. _____ 19,200

Polesteramide B (expressed in mols unless otherwise noted):
- Dimethyladipate _____ 1.2
- Ethanolamine _____ .6
- Trimethylol propane _____ 1.45
- OH No. _____ 507
- Acid No. _____ .8
- H₂O (by weight) _____ .10
- Viscosity (cps.) at 83° F. _____ 27,500

Examples of polyethers that are useful in the present invention are as follows.

Polyether A (expressed in mols unless otherwise noted):
- Trimethylol propane _____ 1
- Propylene oxide _____ 4.75
- OH No. _____ 404
- Acid No. _____ .05
- H₂O (by weight) _____ .1
- Viscosity (cps.) at 83° F. _____ 500

Polyether B (expressed in mols unless otherwise noted):
- Pentaerythritol _____ 1
- Propylene oxide _____ 9.35
- OH No. _____ 370
- Acid No. _____ .02
- H₂O (by weight) _____ 0.3
- Viscosity (cps.) at 83° F. _____ 800

Polyether C (expressed in mols unless otherwise noted):
- Sorbitol _____ 1
- Propylene oxide _____ 10
- OH No. _____ 495
- Acid No. _____ .30
- H₂O (by weight) _____ .1
- Viscosity (cps.) at 83° F. _____ 7500

In all cases, the acid number, hydroxyl number, viscosity and water content of the polyester, polyesteramide and polyether may be controlled within the limits noted by control of the processing with respect to time and temperature as is well known in the art. In this connection, the viscosity cited is of importance with respect to ease of handling since it is apparent that if the material is too viscous, it will be difficult to convey. Viscosities within the ranges noted are therefore preferred; however, higher reacting temperatures may be used to improve handling in certain cases.

In the preparation of the polyurethane material, I prefer to use the prepolymer technique to, in a measure, control the heat of reaction whereby reaction temperatures within easily controlled limits may be maintained. The prepolymer, as set forth herein, contains all of the organic diisocyanates used in a given recipe and at least a portion of the polyester, polyesteramide, polyether, etc., required. By pre-reacting these two ingredients, it is possible to better control the final reaction when the prepolymer is added to the remaining polymeric material.

If proper controls are provided, this prepolymer technique may be circumvented and, in this respect, it is possible to mix directly all the organic polyisocyanate, all the polymeric material and all the other ingredients in a single mixing head. In certain instances, this technique may be preferred in view of the specific ingredients used. However, since the reaction between the isocyanate and the polymeric material produces considerable exothermic heat, the temperature of the reaction mixture must also be closely regulated to prevent excessive loss of gas and it is for these reasons that it is generally preferred to use the prepolymer or partial reaction technique to improve control factors.

A partial listing of prepolymers which may be used is:

Prepolymer A (expressed in parts by weight):
- Polyisocyanate ingredient A _____ 75
- Polyester A _____ 25

Prepolymer B (expressed in parts by weight):
- Isocyanate ingredient B _____ 80
- Polyester B _____ 20

Prepolymer C (expressed in parts by weight):
- Isocyanate ingredient C _____ 78
- Polyester D _____ 22

Prepolymer D (expressed in parts by weight):
- Isocyanate ingredient A _____ 75
- Polyester C _____ 25

Prepolymer E (expressed in parts by weight):
- Polyisocyanate ingredient D _____ 71
- Polyether A _____ 29

Prepolymer F (expressed in parts by weight):
- Polyisocyanate ingredient A _____ 75
- Polyether C _____ 25

Prepolymer G (expressed in parts by weight):
- Polyisocyanate ingredient A _____ 70
- Polyether B _____ 30

Prepolymer H (expressed in parts by weight):
- Polyisocyanate ingredient D or A _____ 82.9
- Polyesteramide A _____ 17.1

Prepolymer I (expressed in parts by weight):
- Polyisocyanate ingredient A _____ 86.6
- Polyesteramide B _____ 13.4

Prepolymer J (expressed in parts by weight):
- Polyisocyanate ingredient D _____ 81.5
- Polyester K _____ 18.5

Prepolymer K (expressed in parts by weight):
- Polyisocyanate ingredient F _____ 80.8
- Polyester L _____ 19.2

Prepolymer L (expressed in parts by weight):
- Polyisocyanate ingredient A _____ 80.1
- Polyester F _____ 19.9

Prepolymer M (expressed in parts by weight):
- Polyisocyanate ingredient A _____ 80.6
- Polyester M _____ 19.4

A partial listing of activator mixtures which may be used is:

Activator mixture A (expressed in parts by weight):
- Ethylene glycol _____ 11
- Dimethylethanolamine _____ .25
- Emulsifier made up of 90% polypropylene glycol and 10% polyethylene glycol _____ .5

Activator mixture B (expressed in parts by weight):
- Triethylamine _____ .25
- Organic silicone _____ .8

Activator mixture C (expressed in parts by weight):
- Triethylamine _____ .25
- Emulsifier made up of 90% polypropylene glycol and 10% polyethylene glycol _____ .8

Activator mixture D (expressed in parts by weight):
- Ethylene glycol _____ 11
- Triethylamine _____ .25
- Sorbitan monopalmitate _____ .5

Activator mixture E (expressed in parts by weight):
- Anhydrous hexane triol _____ 3.5
- N-methyl morpholine _____ .25
- Emulsifier made up of 90% polypropylene glycol and 10% polyethylene glycol _____ .5

Activator mixture F (expressed in parts by weight):
- NNN'N' tetrakis (2-hydroxypropyl)ethylenediamine ("Quadrol," Wyandotte Chemical Company) _____ 44
- Emulsifier made up of 90% polypropylene glycol and 10% polyethylene glycol _____ .5

Activator mixture G (expressed in parts by weight):
- NNN'N' tetrakis (2-hydroxypropyl) ethylenediamine _____ 26
- Triethylenediamine _____ 1
- Emulsifier made up of 90% polypropylene glycol and 10% polyetheylene glycol _____ .5

Activator mixture H (expressed in parts by weight):
- NNN'N' tetrakis (2-hydroxypropyl) ethylenediamine _____ 50

Emulsifier made up of 90% polypropylene glycol and 10% polyethylene glycol _____ .5

Activator mixture I (expressed in parts by weight):
NNN'N' tetrakis (2-hydroxypropyl) ethylenediamine _____ 26
Triethylenediamine _____ .3
Emulsifier made up of 90% polypropylene glycol and 10% polyethylene glycol _____ .5

Activator mixture J (expressed in parts by weight):
Ethylene glycol _____ 9
Emulsifier made up of 90% polypropylene glycol and 10% polyethylene glycol _____ .5

In general, the activator mixture should be anhydrous and includes a catalyst which triggers and controls the rate of reaction and which is preferably an amine; an emulsifier that improves compatibility and may also include a cross linking agent. Other suitable materials may be substituted in the mixture which will accomplish the end results desired.

It will be noted that activator mixtures B and C contain no cross linking agent. Increasing the quantity of polyester in the final recipe will compensate for this omission. In other words, additional polyester can be used to accomplish the cross linking in place of a separate cross linking agent, if desired.

In general, the materials in the activator mixture are used for control purposes. The cross linking agent is used to facilitate the polymerization reaction and to improve the complexity of the cross linked character of the polyurethane. The catalyst is used principally to control the rate of reaction. The emulsifier aids in controlling cell size which is of considerable importance. It is desirable that the cells be small and numerous so that the walls thereof are not easily ruptured and the number of enclosures for the gas per unit volume be at a maximum.

Specific fluorinated, halogenated, saturated aliphatic hydrocarbons are selected for use as foaming agents. One commercial source of these gases are those sold commercially by duPont under the trade name of Freon. Satisfactory Freons are Freon 11 which is trichloromonofluoromethane, Freon 114 which is dichlorotetrafluoroethane, Freon 113 which is trichlorotrifluoroethane, Freon 12–B2 which is dibromodifluoromethane, mixtures thereof, etc. These materials boil at atmospheric pressure within an easily controlled range of temperature and are substantially insoluble in the polyurethane materials which are used to contain them. Another Freon material that is useful since it is substantially insoluble in polyurethanes is Freon C316 which is an ali-cyclic compound and, specifically, dichlorohexafluorocyclobutane. While this material is not generally classified as aliphatic, it is to be understood that it is included in the broad classification of aliphatic hydrocarbons as set forth herein. This material has a relatively high boiling point of about 140° F. and also has a high molecular weight. Freon 114–B2 is also useful. This is dibromotetrafluoroethane and has a boiling point of about 118° F. Both of these materials are substantially insoluble in the polyurethane foam and have relatively high boiling points above room temperature. In this instance, it is believed that the fluorinated hydrocarbon, after formation of the foam, condenses in the cells thereof particularly when the foam is used as refrigeration insulation to form a partial vacuum in the cells. In these instances, it is apparent that the reaction must be carried out at temperatures above the boiling points of the specific materials in order to assure foaming of the polyurethane during the cross linking reaction thereof.

Other insoluble Freon gases having having lower boiling points may also be used but, in this instance, it is obvious that pressurized equipment must be used to maintain the gas in liquefied state during the mixing process. Under these conditions, therefore, a greater degree of control is necessary together with more expensive equipment.

All of the fluorinated, halogenated, saturated aliphatic hydrocarbons are not satisfactory for use in the disclosed polyurethanes. For example, compounds which are soluble in the polyurethane material are not useful for my purposes since these gases tend to dissolve into the foam even though they are good blowing agents. Thus, after the foam is formed, the gases within the cells thereof dissolve into the foam and soften the foam and are eventually lost whereby the cells become filled with air. Such gases as dichlorofluoromethane (Freon 21), monochlorodifluoromethane (Freon 22) and the chlorinated hydrocarbon gas, methylene chloride, all fall in this category.

The following examples are given to illustrate satisfactory recipes and procedures for forming polyurethane materials for heat insulating and structural purposes.

EXAMPLE 1

A quantity of a mixture of prepolymer A and Freon 11 in liquefied form are placed in tank 16 in proportions by weight of 100 parts of the prepolymer to 20 parts of the Freon. The ingredients are mixed and stored therein at 52° F. at atmospheric pressure.

Tank 18 is supplied with a mixture of polyester A and activator mixture A in proportions of 60 parts by weight of the polyester to 1 part of the activator. This mixture is kept at atmospheric pressure and 110° F.

The positive displacement pumps 20 and 22 are then started to supply materials from tanks 16 and 18 to the chamber 10 in proportions by weight of 120 parts from tank 16 to 71.75 parts from tank 18. The mixture is then discharged in appropriate quantities into a mold heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 at 75° F. as compared to a $CO_2$ expanded foam of the same polyurethane composition which has a factor of about .236 as noted in FIG. 3 of the drawings.

EXAMPLE 2

A quantity of a mixture of prepolymer D and Freon 11 in liquefied form is placed in tank 16 in proportions by weight of 100 parts of the prepolymer to 35 parts of the Freon. The ingredients are mixed and stored therein at 52° F. at atmospheric pressure.

Tank 18 is supplied with a mixture of polyester C and activator mixture B in proportions of 95 parts by weight of the polyester to 1 part of the activator. This mixture is kept at atmospheric pressure and 110° F.

The positive displacement pumps 20 and 22 are then started to supply materials from tanks 16 and 18 to the chamber 10 in proportions by weight of 135 parts from tank 16 to 96.05 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.0 pounds per foot$^3$ and a stabilized heat conductivity factor of about .145 at 75° F. as compared to a $CO_2$ expanded foam of the same polyurethane composition which has a factor of about .236 as noted in FIG. 3 of the drawings.

EXAMPLE 3

A quantity of a mixture of prepolymer A and Freon 11 in liquefied form are placed in tank 16 in proportions by weight of 100 parts of the prepolymer to 20 parts of the Freon. The ingredients are mixed and stored therein at 52° F. at atmospheric pressure.

Tank 18 is suplied with a mixture of polyester C and activator mixture C in proportions of 95 parts by weight of the polyester to 1 part of the activator. This mixture is kept at atmospheric pressure and 110° F.

The positive displacement pumps 20 and 22 are then started to supply materials from tanks 16 and 18 to the chamber 10 in proportions by weight of 120 parts from tank 16 to 95.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 at 75° F. as compared to a $CO_2$ expanded foam of the same polyurethane composition which has a factor of about .236 as noted in FIG. 3 of the drawings.

EXAMPLE 4

A quantity of a mixture of prepolymer A and Freon 113 in liquefied form is placed in tank 16 in proportions by weight of 100 parts of the prepolymer to 30 parts of the Freon. The ingredients are mixed and stored therein at 70° F. at atmospheric pressure.

Tank 18 is supplied with a mixture of polyester D and activator mixture A in proportions of 60 parts by weight of the polyester to 1 part of the activator. This mixture is kept at atmospheric pressure and 100° F.

The positive displacement pumps 20 and 22 are then started to supply materials from tanks 16 and 18 to the chamber 10 in proportions by weight of 130 parts from tank 16 to 71.75 parts from tank 18. This mixture is then discharged in appropriate quantities to a mold heated to 150° F. whereupon the ingredients react to provide rigid closed cell foam wherein the cells of the foam are substantially filled with Freon 113. A foam of this nature has a density of about 2.25 pounds per foot$^3$ and a stabilized heat conductivity factor of about .180 at 75° F. as compared to a $CO_2$ expanded foam of the same polyurethane composition which has a factor of about .236 as noted in FIG. 3 of the drawings.

EXAMPLE 5

A quantity of a mixture of prepolymer B and a mixture of Freon 113 and 114 in liquefied form are placed in tank 16 in proportions by weight of 100 parts of the prepolymer to 20 parts of the Freon which is made up of 25 parts by weight of Freon 113 and 75 parts by weight of Freon 114. The ingredients are mixed and stored therein at 45° F. at atmospheric pressure.

Tank 18 is supplied with a mixture of polyester B and activator mixture C in proportions of 95 parts by weight of the polyester to 1 part of the activator. This mixture is kept at atmospheric pressure and 120° F.

The positive displacement pumps 20 and 22 are then started to supply materials from tanks 16 and 18 to the chamber 10 in proportions by weight of 120 parts from tank 16 to 95.75 parts from tank 18. This mixture is then discharged in appropriate quantities to a mold heated to 150° F. whereupon the ingredients react to provide rigid closed cell foam wherein the cells of the foam are substantially filled with the Freon mixture. A foam of this nature has a density of about 3.0 pounds per foot$^3$ and a stabilized heat conductivity factor of about .170 at 75° F. as compared to a $CO_2$ expanded foam of the same polyurethane composition which has a factor of about .236 as noted in FIG. 3 of the drawings.

EXAMPLE 6

A quantity of a mixture of prepolymer C and Freon 11 in liquefied form are placed in tank 16 in proportions by weight of 100 parts of the prepolymer to 20 parts of the Freon. The ingredients are mixed and stored therein at 52° F. at atmospheric pressure.

Tank 18 is supplied with a mixture of polyester C and activator mixture D in proportions of 60 parts by weight of the polyester to 1 part of the activator. This mixture is kept at atmospheric pressure and 110° F.

The positive displacement pumps 20 and 22 are then started to supply materials from tanks 16 and 18 to the chamber 10 in proportions by weight of 120 parts from tank 16 to 71.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.5 pounds per foot$^3$ and a stabilized heat conductivity factor of about .145 at 75° F. as compared to a $CO_2$ expanded foam of the same polyurethane composition which has a factor about .236 as noted in FIG. 3 of the drawings.

EXAMPLE 7

A quantity of a mixture of prepolymer D and Freon 11 in liquefied form are placed in tank 16 in proportions by weight of 100 parts of the prepolymer to 30 parts of the Freon. The ingredients are mixed and stored therein at 52° F. at atmospheric pressure.

Tank 18 is supplied with a mixture of polyester E and activator mixture E in proportions of 60 parts by weight of the polyester to 1 part of the activator. This mixture is kept at atmospheric pressure and 110° F.

The positive displacement pumps 20 and 22 are then started to supply materials from tanks 16 and 18 to the chamber 10 in proportions by weight of 130 parts from tank 16 to 64.25 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.25 pounds per foot$_3$ and a stabilized heat conductivity factor of about .150 at 75° F. as compared to a $CO_2$ expanded foam of the same polyurethane composition which has a factor of about .236 as noted in FIG. 3 of the drawings.

EXAMPLE 8

A quantity of a mixture of a prepolymer E and Freon 11 in liquified form are placed in tank 16 in proportions by weight of 100 parts of prepolymer to 20 parts of the Freon. The ingredients are mixed and stored therein at 55° F. at atmospheric pressure.

Tank 18 is supplied with a mixture of activator F. This activator is kept at atmospheric pressure and 75° F.

The positive displacement pumps 20 and 22 are then started to supply materials from tanks 16 and 18 to the chamber 10 in proportions by weight of 120 parts from tank 16 to 44.5 parts from tank 18. This mixture is then discharged in appropriate quantities to a mold heated between 110° F. and 150° F. whereupon the ingredients react to provide rigid closed cell foam wherein the cells of the foam are substantially filled with Freon 11. A foam of this nature has a density of about 2.5 pounds per cubic foot and a stabilized heat conductivity factor of about .150 at 70° F. as compared to $CO_2$ expanded foam of the same polyurethane composition which has a factor of about .236 as noted in FIG. 3 of the drawings.

EXAMPLE 9

A quantity of a mixture of prepolymer F and Freon 11 in liquefied form are placed in tank 16 in proportions by weight of 100 parts of the prepolymer to 20 parts of Freon. The ingredients are mixed and stored therein at 50° F. at atmospheric pressure.

Tank 18 is supplied with a mixture of polyether C and activator mixture I in proportions of 29.5 parts by weight of the activator mixture to 30 parts by weight of the polyether. The mixture is kept at atmospheric pressure at 110° F.

The positive displacement pumps 20 and 22 are then started to supply materials from tanks 16 and 18 to the chamber 10 in proportions by weight of 120 parts from tank 16 to 59.5 parts from tank 18. The mixture is then discharged in appropriate quantities to a mold heated to 150° F. whereupon the ingredients react to provide rigid closed cell foam wherein the cells of the foam are substantially filled with Freon 11. A foam of this nature has a density of about 2.3 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

EXAMPLE 10

A quantity of a mixture of prepolymer G and Freon 11 in liquefied form are placed in tank 16 in proportions by weight of 100 parts of the prepolymer to 20 parts of the Freon. The ingredients are mixed and stored therein at 48° F. at atmospheric pressure.

Tank 18 is supplied with activator mixture F. This mixture is kept at atmospheric pressure at about 110° F.

The positive displacement pumps 20 and 22 are then started to supply materials from tanks 16 and 18 to the chamber 10 in proportions by weight of 120 parts from tank 16 to 44.5 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.4 pounds per cubic foot and a stabilized heat conductivity factor of about .150 to 70° F. as compared to a $CO_2$ expanded foam of the same polyurethane composition which has a factor of about .236 as noted in FIG. 3 of the drawings.

EXAMPLE 11

A quantity of a mixture of prepolymer L and Freon 11 in liquefied form are placed in tank 16 in proportions by weight of 100 parts prepolymer to 20 parts of the Freon. The ingredients are mixed and stored therein at 50° F. at atmospheric pressure.

Tank 18 is supplied with activator mixture D and polyester F in proportions by weight of 57 parts of the polyester to 11.75 parts of the activator. This mixture is kept at atmospheric pressure at about 110° F.

The positive displacement pumps 20 and 22 are then started to supply materials from tanks 16 and 18 to the chamber 10 in proportions by weight of 120 parts from tank 16 to 68.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.4 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

EXAMPLE 12

A quantity of a mixture of prepolymer J and Freon 11 in liquified form are placed in tank 16 in proportions by weight of 100 parts of the prepolymer to 20 parts of the Freon. The ingredients are mixed and stored therein at 50° F. at atmospheric pressure.

Tank 18 is supplied with activator mixture A and polyester K in proportions by weight of 55 parts of the polyester to 11.75 parts of the activator. This mixture is kept at atmospheric pressure at about 110° F.

The positive displacement pumps 20 and 22 are then started to supply materials from tanks 16 and 18 to the chamber 10 in proportions by weight of 120 parts from tank 16 to 66.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.35 pounds per cubic foot and a stabilized heat conductivity factor of about .150 to 70° F. as compared to a $CO_2$ expanded foam of the same polyurethane composition which has a factor of about .236 as noted in FIG. 3 of the drawings.

EXAMPLE 13

This material was made in exact accordance with the procedures set forth in Example 11 wherein prepolymer M is substituted for prepolymer L and activator mixture A is substituted for activator mixture D. Of course, polyester M is also used in tank 18 to be compatible with the prepolymer.

The foam from this example has a density of about 2.35 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

EXAMPLE 14

A quantity of a mixture of prepolymer K and Freon 11 in liquefied form are placed in tank 16 in proportions by weight of 100 parts prepolymer to 20 parts of the Freon. The ingredients are mixed and stored therein at 50° F. at atmospheric pressure.

Tank 18 is supplied with activator mixture A and polyester L in proportions by weight of 60 parts of the polyester to 11.75 parts of the activator. This mixture is kept at atmospheric pressure at about 110° F.

The positive displacement pumps 20 and 22 are then started to supply materials from tanks 16 and 18 to the chamber 10 in proportions by weight of 120 parts from tank 16 to 71.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.42 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

EXAMPLE 15

A quantity of a mixture of prepolymer H and Freon 11 in liquefied form are placed in tank 16 in proportions by weight of 100 parts prepolymer to 20 parts of the Freon. The ingredients are mixed and stored therein at 50° F. at atmospheric pressure.

Tank 18 is supplied with activator mixture J and polyesteramide A in proportions by weight of 65 parts of the polyesteramide to 9.5 parts of the activator. This mixture is kept at atmospheric pressure at about 110° F.

The positive displacement pumps 20 and 22 are then started to supply materials from tanks 16 and 18 to the chamber 10 in proportions by weight of 180 parts from tank 16 to 111.75 parts from tank 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.38 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

EXAMPLE 16

A quantity of a mixture of prepolymer I and Freon 11 in liquefied form are placed in tank 16 in proportions by weight of 100 parts prepolymer to 20 parts of the Freon. The ingredients are mixed and stored therein at 50° F. at atmospheric pressure.

Tank 18 is supplied with activator mixture J and polyesteramide B in proportions by weight of 110 parts of the polyesteramide to 19.0 parts of the activator. This mixture is kept at atmospheric pressure at about 110° F.

The positive displacement pumps 20 and 22 are then started to supply materials from tanks 16 and 18 to the chamber 10 in proportions by weight of 240 parts from tank 16 to 258 parts from tanks 18. This mixture is then discharged in appropriate quantities to a mold heated to 150° F. whereupon the ingredients react to provide rigid closed cell foam wherein the cells of the foam are substantially filled with Freon 11. A foam of this nature has a density of about 2.4 pounds per cubic foot and a stabilized heat conductivity factor of about .150 at 70° F. as compared to a $CO_2$ expanded foam of the same polyurethane composition which has a factor of about .236 as noted in FIG. 3 of the drawings.

All initial and stablized heat conductivity figures as set forth in the several examples and comparisons herein are in British thermal units per inch thickness per square foot area per degree Fahrenheit temperature differential per hour and are based on tests made on one-inch thick slabs having open cut surfaces on all six faces aged at an average mean insulation temperature of 70° F. and at one atmosphere.

It is to be understood that the foregoing recipes and procedures are merely exemplary of satisfactory formulations and methods which may be used in carrying out my invention. Deviations in recipes, use of equivalent materials in amounts required to obtain the desired results and other changes, which are within the purview of persons skilled in the art, all come within the scope of my invention since no effort has been made to disclose all materials and combinations of materials which may be used in the invention with success. Suffice it to say that the production of rigid, closed cell polyurethanes which preferably include a retained halogenated hydrocarbon gas or mixture of gases within the cells thereof in initial quantities of at least 93% of the cell gases come within the scope of my invention and provide materials having good structural strength and excellent heat insulating properties.

This figure (93%) is obtained by following the teachings set forth herein, and material within this range will have an initial heat conductivity factor of from .095 to .150 as initially formed. It is apparent, after referring to the curves shown in FIG. 3 and to be discussed in detail hereinafter, that there is a period of stabilization required in order to obtain a stabilized heat conductivity factor. During this period I believe that atmospheric air diffuses into a least the surface cells of a piece of insulation whereby a gradient is established which prevents or retards full diffusion. The time stabilized insulation will have a stabilized heat conductivity factor of .145 to .180. Materials having factors higher than .180 are not desired.

It is believed that it is possible to reach the same end by mixing the Freon with one or more of the constituents of atmospheric air or with other suitable materials which are insoluble in the polyurethane. In this case, the percent Freon initially in the foam may be below 93% while the stabilized heat conductivity factor will remain within the above-noted range. Thus, this invention is specifically directed to closed cell Freon blown polyurethane foams which contain retained Freons in the cells thereof and which have a stabilized heat conductivity factor of .180 or below.

The thermal conductivity curves for two of the materials disclosed herein are shown in FIG. 3 wherein the straight line curves numbered 50, 52 and 54 are for comparative purposes and represent the heat conductivity curves for air, carbon dioxide and trichloromonofluoromethane (Freon 11) respectively. Curve 56 represents the thermal conductivity curve of a polyurethane panel made by using the ingredients disclosed in Example 1 with water added wherein carbon dioxide formed in situ was the foaming agent. In this case, it will be noted that the thermal conductivity of the panel was approximately .158 at the beginning and then increased gradually until approximately 140 days was reached whereupon the curve leveled out at about .236. This indicates diffusion of the carbon dioxide with replacement thereof by air whereby the heat insulating qualities of the panel finally became stabilized. In differentiation, curve 58 is a panel made in exact accordance with Example 1 wherein Freon 11 was the blowing agent. In this connection, the loss of thermal conductivity is much less and the heat conductivity of the panel appears to have become stabilized at about 120 days wherein the stabilized conductivity factor is .145 and thus shows tremendous improvement over the carbon dioxide blown foam. In both instances, the panels were stored under elevated temperature conditions from 110° to 140° F. to accelerate stabilization. In this connection, panels used in refrigerators and the like for heat insulation purposes will stabilize at a much slower rate but, nevertheless, tests have proved that stabilization will occur and have also proved that the Freon blown polyurethane materials stabilize at heat conductivity factors of about .145 to .180 according to the Freons used which produces an exceptional heat insulation material.

It is possible to produce refrigerators, for example, wherein the insulation thickness is reduced by approximately 66% without, in any way, reducing the insulating qualities of the refrigerator over a similar refrigerator using conventional insulation. It is apparent that this tremendous reduction in insulation thickness permits a corresponding increase in the internal size of the refrigerator whereby the storage capacity of the refrigerator may be increased up to 33% without changing the over-all outside dimensions thereof. These factors are extremely important in refrigeration design and permit greater food storage capacity in the same over-all space wherein the insulating qualities of the refrigerator are equally as good as any refrigerator heretofore produced commercially. Further, the improved insulating qualities of the material claimed herein make frost-proof compartments within a refrigerator feasible commercially. In the past, the volume and cost of the insulation required for commercially successful frostproofing made the use thereof impractical. Curves similar to the curve noted at 58 in FIG. 3 have been plotted for various Freon materials and, in all instances, the improvement in insulating qualities is noted and the same stabilization of heat insulating qualities is apparent. In this connection, of course, the position of the curve on the chart will vary in accordance with the heat conductivity factor of the particular Freon being used although the curves will be substantially parallel to the curve shown at 58.

The polyurethane heat insulation disclosed herein not only provides improved heat insulating qualities for a refrigerator or other device which is being insulated thereby but also reduces the over-all weight of the structure due to the reduced thickness of insulation and simultaneously improves the structural strength thereof since the rigid foamed in place polyurethane insulation bonds well to the internal surfaces of the cabinet materials to form a coextensive bond between the outside cabinet walls and the inside cabinet walls, whereby a tremendously strong structure is obtained. Drop tests on cabinets made under the teachings of the present invention wherein rigid foamed in place polyurethane insulation is used shows that cabinets dropped from any given height onto a floor withstand the fall considerably better than do cabinets using ordinary insulation which is not bonded to the cabinet walls. This is due to the two factors noted above. First, the weight of the cabinet is less due to the polyurethane insulation and, second, the rigidity of the cabinet is greatly improved due to the bonding of the insulation to the cabinet walls. This condition is further enhanced by the integral nature of the several walls of the cabinet whereby the top, bottom, both side walls and the back are molded or cast in place in an integral unit. This one-piece insulation, coextensively bonded to the walls of the cabinet, greatly improves strength and rigidity due to the very nature of its structure. It is apparent that reinforcements may be added with respect to the refrigerator walls prior to the pouring of the polyurethane material therein and, in some instances, such reinforcements are desirable although not always necessary. These factors vary in accordance with the specific refrigerator being made.

The rigidity and one-piece structure of the cabinet and insulation improve tremendously the ability of the cabinet to withstand violent vibration tests and this, too, is a great advantage gained by the used of the polyurethane insulation. Cabinets may be shipped over long distances by truck or rail and are not in any way affected by the vibration.

While the embodiments of the present invention as herein disclosed constitute preferred forms, it is to be understood that other form might be adopted.

What is claimed is as follows:

1. In a process for manufacturing a rigid polyurethane closed cell heat insulation having the cells substantially filled with retained trichloromonofluoromethane, the steps comprising; introducing into a mixing chamber a first substantially anhydrous liquid component consisting of an organic polyisocyanate, introducing into said mixing chamber a portion only of a second anhydrous liquid component comprising a polymeric material having a plurality of reactive hydrogen groups and a negligible acid number not substantially greater than 1.5 and a high hydroxyl number of about 420 to 440 and consisting of a polyester which is a reaction product of a polycarboxylic acid and a polyhydric alcohol and being capable of reacting with the first mentioned component to form a liquid isocyanate-modified polymer, reacting said two components within said chamber, then introducing into said chamber the remainder of said polymeric material together with trichloromonofluoromethane in liquid form, mixing thoroughly all said liquid components, vaporizing said trichloromonofluoromethane by heat generated due to the exothermic reaction between the isocyanate-modified polymer and the remainder of said polymeric material, initiating the formation of cells in said liquid mixture solely by the vaporization of said trichloromonofluoromethane, and subsequently pouring the resulting mixture into a mold wherein continuing polymerization takes place to form a rigid closed cell structure containing the trichloromonofluoromethane in the cells thereof.

2. A rigid polyester polyurethane cellular material prepared from (1) an anhydrous, fluid polyester polyol having a hydroxyl number of from about 350 to 500 and having an average of at least 3 hydroxyl groups per molecule, said polyester polyol being prepared from a composition comprising phthalic anhydride, adipic acid and trimethylolpropane, (2) an isocyanato-terminated polyester polyurethane having an average of at least 3 isocyanato groups per molecule and prepared by reacting a molar excess of an arylene diisocyanate with a polyester polyol of the type described in (1), above, (3) an arylene diisocyanate, (4) trichloromonofluoromethane and (5) a tertiary amine catalyst; the total number of isocyanato groups in (2) and (3) being about equal to the total number of hydroxyl groups in (1); there being about 8.7 to 18.2 parts by weight of said trichloromonofluoromethane for every 100 parts by weight of said rigid polyurethane cellular material.

References Cited

UNITED STATES PATENTS

| 3,080,329 | 3/1963 | Barringer et al. | 156—78 X |
| 3,091,551 | 5/1963 | Robertson | 260—2.5 X |
| 3,099,676 | 7/1963 | Lanham | 260—2.5 X |
| 2,948,691 | 8/1960 | Windemuth et al. | 260—2.5 |
| 2,866,774 | 12/1958 | Price | 260—2.5 X |
| 2,653,139 | 9/1953 | Sterling. | |
| 2,744,042 | 5/1956 | Pace. | |
| 2,850,467 | 9/1958 | Livingood | 260—2.5 |
| 2,882,701 | 4/1959 | Nelson et al. | 62—405 |
| 2,927,876 | 3/1960 | Hoppe et al. | 154—54 |
| 2,957,832 | 10/1960 | Gmitter et al. | 260—2.5 |
| 2,860,378 | 11/1958 | Urchick | 18—48 |
| 2,884,386 | 4/1959 | McMillan et al. | 18—48 |
| 2,962,183 | 4/1960 | Rill et al. | 220—9 |
| 3,034,996 | 5/1962 | Kaplan. | |
| 3,072,582 | 1/1963 | Frost | 260—2.5 |

FOREIGN PATENTS

| 754,522 | 8/1956 | Great Britain. |
| 860,106 | 12/1952 | Germany. |
| 1,161,239 | 3/1958 | France. |
| 821,342 | 10/1959 | Great Britain. |

OTHER REFERENCES

Dougan: "Where to Use Urethane Foams," Materials in Design Engineering, vol. 49, No. 1, January 1959, pp. 86–91.

DONALD E. CZAJA, Primary Examiner

F. McKELVEY, Assistant Examiner

U.S. Cl. X.R.

161—190, 213